March 8, 1938.  A. P. BALL  2,110,121
VENTILATING WINDOW
Filed Jan. 11, 1935  3 Sheets-Sheet 2
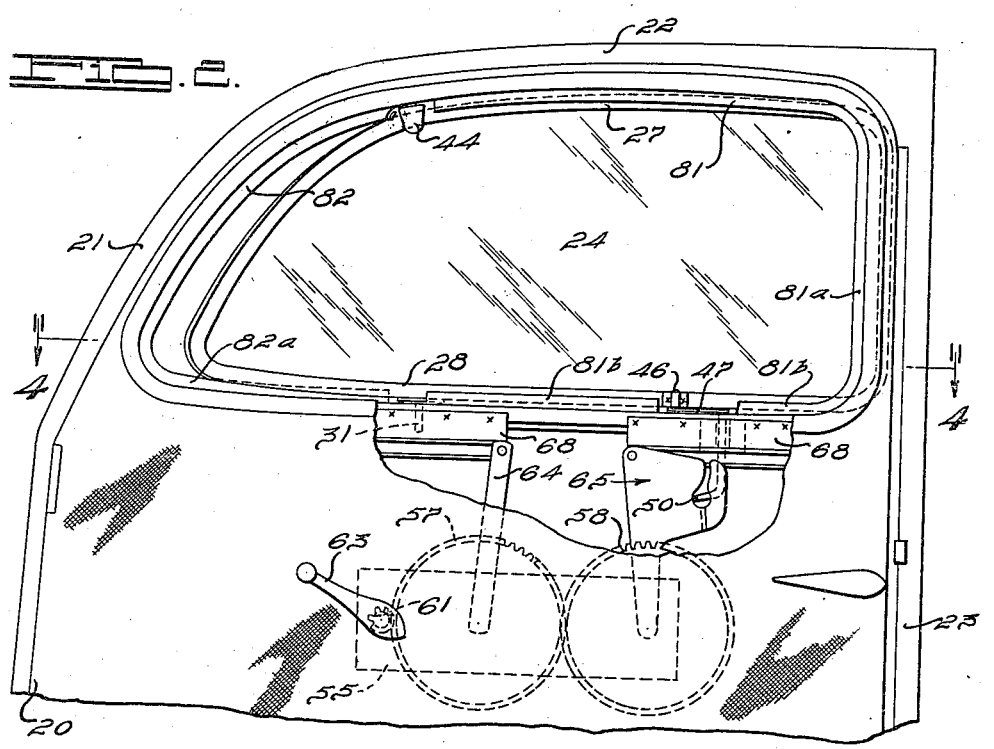
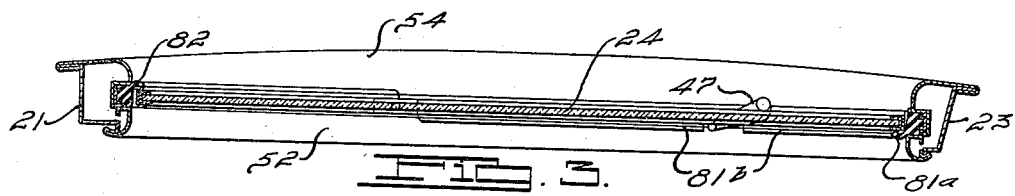
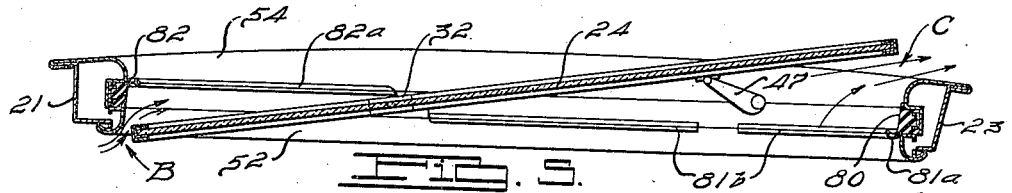
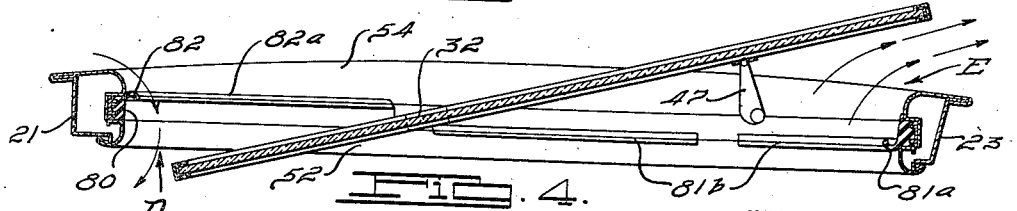
INVENTOR
Albert P. Ball.
BY Dike, Calvert & Gray
ATTORNEYS.

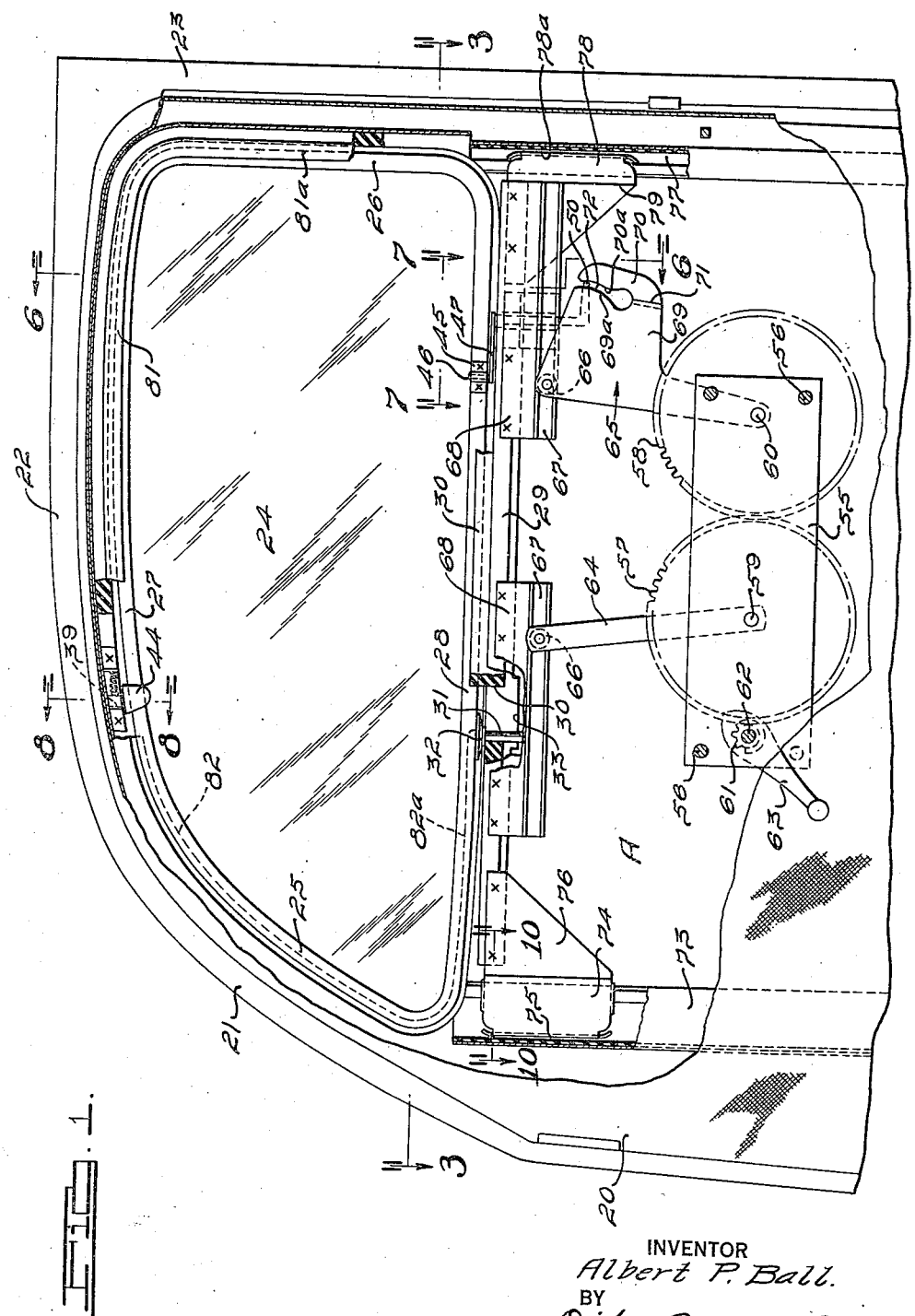

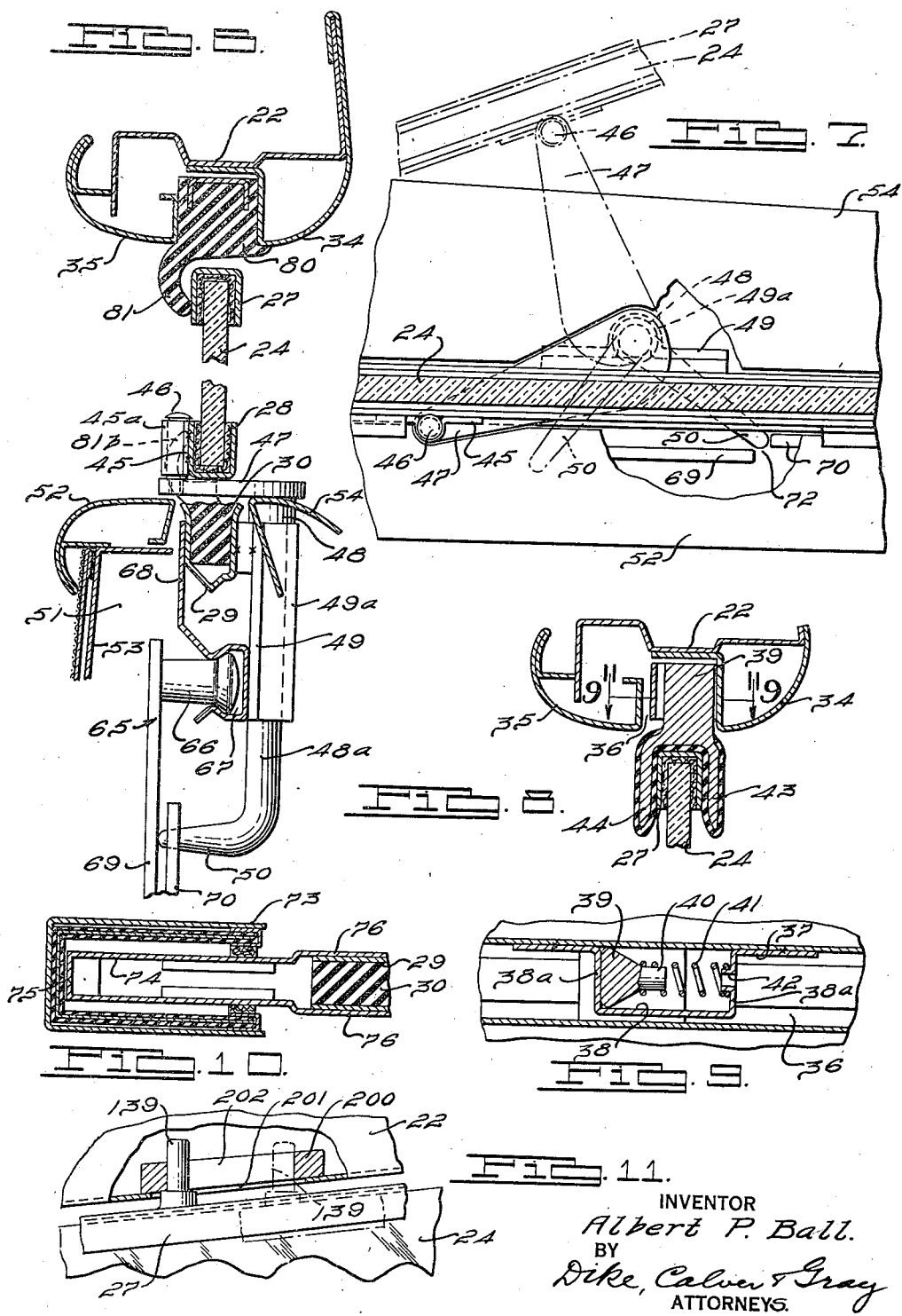

Patented Mar. 8, 1938

2,110,121

UNITED STATES PATENT OFFICE 2,110,121

VENTILATING WINDOW

Albert P. Ball, Detroit, Mich., assignor to Briggs Manufacturing Company, Detroit, Mich., a corporation of Michigan Application January 11, 1935, Serial No. 1,336

8 Claims. (Cl. 296—44)

This invention relates particularly to that type of ventilating windows for vehicle bodies or the like, especially door or side windows of automobile bodies, wherein it is desirable to swing or pivotally adjust a window pane or glass panel in a horizontal direction within the window opening to provide ventilating openings through which air may either be exhausted from the body or directed into the body or both.

An object of the invention is to provide a ventilating window of the foregoing type wherein the adjustable glass panel may be raised and lowered and also moved, when raised, into pivotal relation to the stationary frame of the window in order to permit swinging movement thereof into and out of ventilating position.

A further object of the invention is to provide a ventilating window structure of the foregoing type wherein the pivoted glass panel may not only be swung horizontally into ventilating position but also longitudinally while in such position to vary the relation of the front and rear upright edges of the panel to the corresponding edges of the frame and hence vary the nature of the air circulation between the interior and exterior of the body.

A further object of the invention is to provide a ventilating window structure wherein a glass panel is pivotally mounted within the window opening to swing into and out of various ventilating positions and wherein the improved construction is such that the panel may be bodily displaced with respect to the window frame, preferably in a longitudinal direction.

A further object is to provide a substantially vertically sliding window glass panel and disconnectable means for pivotally connecting the panel to the top of the frame whereby the glass may be swung into various ventilating positions when in fully raised position.

A further object of the invention is to provide improved regulator mechanism having a single manual control for raising and lowering the glass panel, swinging it into and out of ventilating position, and shifting it bodily and longitudinally while in ventilating relation, or for accomplishing any predetermined combination of these operations.

Other objects and advantages of the invention will appear from the following description and appended claims when considered in connection with the accompanying drawings forming a part of this specification.

Fig. 1 is a fragmentary front elevation of the inside of a vehicle door embodying the invention, with the window in closed position.

Fig. 2 is a fragmentary elevation, partly broken away, of the inside of the vehicle door shown in Fig. 1, with the window in full ventilating position.

Fig. 3 is a horizontal section taken substantially along the line 3—3 of Fig. 1, looking in the direction of the arrows.

Fig. 4 is a horizontal section taken substantially along the line 4—4 of Fig. 2, looking in the direction of the arrows and showing the window adjusted into full ventilating position.

Fig. 5 is a view similar to Figs. 3 and 4 showing the window adjusted into a partial ventilating position.

Fig. 6 is a vertical section taken substantially along the line 6—6 of Fig. 1, in the direction of the arrows, with the window glass broken away.

Fig. 7 is a fragmentary horizontal section taken substantially along the line 7—7 of Fig. 1, looking in the direction of the arrows.

Fig. 8 is a detail vertical sectional view taken substantially along the line 8—8 of Fig. 1, in the direction of the arrows.

Fig. 9 is a transverse horizontal detail sectional view taken substantially along the line 9—9 of Fig. 8.

Fig. 10 is a horizontal detail sectional view taken substantially along the line 10—10 of Fig. 1; and Fig. 11 is a fragmentary elevational view, partly in section, showing a modified form of pivot construction.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the drawings there is illustrated, by way of example, a front door of an automobile having a window glass mounted therein and adapted to be raised and lowered by regulator mechanism and to be swung by the regulator mechanism into ventilating position after the glass has been fully elevated. In the construction illustrated the door is hinged at its forward edge and is provided with latch mechanism adjacent its rear edge.

As shown in the drawings, the door comprises a front pillar 20 having an upper rearwardly inclined portion 21, a header 22 and a rear pillar 23. The front and rear pillars together with the header define a window opening which is adapted to be closed by a glass panel 24. The edges of the glass 24 are confined by a metal channel frame comprising a forward or front portion 25, a rear portion 26 and upper and lower connecting portions 27 and 28, respectively. The regulator mechanism for operating the glass includes a metal channel member 29 carrying a rubber weather strip or seal 30 for the lower edge of the glass. The lower portion 28 of the window frame carries a depending stud or pivot pin 31 which extends into and is supported by the glass retainer channel 29 and is adapted to slide in a longitudinal slot therein, the rubber strip 30 being removed for a short distance to permit this sliding movement. The pin has a head 32 which is secured to the under face of the window frame as by spot welding. The lower edge of the retainer 29 is slotted at 33 for a distance corresponding to the desired length of travel of the pin 31 and the metal at the lower margins of the slot is turned downwardly to form guides engaging opposite sides of the pivot pin. Thus the pin 31 provides a sliding pivotal support for the forward lower edge of the glass panel 24.

The header 22 includes outer and inner window reveal portions 34 and 35 respectively, the inner walls of which are spaced to provide a channel 36 therebetween. Located within the channel is a stamped metal housing comprising a side wall 38, end walls 38a and flanges 37 which are secured to one of the walls of the channel in any suitable manner, as by spot welding. The housing is open at its bottom and receives and supports an upright stud member or pivot pin 39 which is preferably triangular in cross section and which has a lateral projection or boss 40 formed thereon. The rear end wall 38a has a spring retainer boss 42. A compression spring 41 is anchored in place by the bosses 40 and 42 and this spring normally holds the pivot pin 39 against the opposite end wall in the position shown in Fig. 9. The stud 39 is bifurcated at its lower end to provide channel forming depending portions 43 and 44 which, as shown in Fig. 8, are covered by rubber or any other suitable non-metallic material. The stud 39 is supported so that it can be turned or partially rotated, when desired, against the action of the spring 41, which spring tends to return it to its normal position as shown in Fig. 9. The purpose of the forked stud member is to provide a socket to receive the upper edge of the glass 24 when the glass is in elevated position, as will be more fully described hereinafter.

The lower edge of the glass 24, that is the frame portion 28 therefor, is provided with a U-shaped bracket 45 having flanges secured to the side of the frame 28 as by spot welding. The bracket has a central sleeve 45a forming a bearing for a headed upright stud or pin 46 which is secured to one end of a link or crank member 47, to the opposite end of which is connected the shouldered upper end 48 of an upright rotatable shaft 48a, the shaft being secured to the glass retainer or channel 29 by means of a U-shaped bracket member 49 having a cylindrical bearing 49a through which the shaft 48a passes. The bracket member is preferably secured to the retainer or channel 29 by means of spot welding, as shown in Fig. 6. The lower end of the shaft 48a is bent at right angles to the vertical portion of the shaft and this lower end extends inwardly at 50 to engage in a cam slot formed in a part of the regulator mechanism, as hereinafter described. The mechanism and associated parts for operating the window project into the well 51 of the door, this well being formed in conventional manner by the inner door panel 53 and garnish molding 52 and outer panel 54.

The window regulator mechanism for raising, lowering and swinging the glass 24 may be of any suitable construction. In the present instance, merely by way of example, it comprises a mounting plate 55 secured by means of screws 56 to the inside of the door. The plate 55 carries a pair of intermeshing gears 57 and 58 which are journaled on the plate by means of pivots 59 and 60, respectively. The gears are operated through a pinion 61 on a shaft 62 to which is attached the usual crank handle 63. Secured to the pivot 59 is a swinging arm 64 and secured to the pivot 60 is a swinging arm shown as a whole at 65, these arms being adapted to be swung in opposite directions upon rotation of the gears. Secured to the outer end of each of the arms is a stud or button-like device 66 having a shank which is riveted to the end of the arm. Depending from the glass retainer or channel 29 is a pair of spaced bracket members 68 preferably secured to the retainer by spot welding, each provided with a runway 67 for the heads of the studs 66. Thus, when the arms are moved, the studs traveling in the runways raise or lower the window glass dependent on the direction in which the arms are moved. The arm 65 has a cam extension 69 provided with a cam slot 72. The outer portion of the cam extension, beyond the cam slot, is offset or bent at 71 to provide a finger 70 offset from the plane of the remaining portion of the cam extension.

Located within the window well and secured to the front door pillar 20 is a vertical glass channel or runway 73 and secured to the rear pillar is a vertical glass channel or runway 77. At the forward end of the retainer 29 there is provided a guide member shown as a whole at 74, this guide member having an outer face or plate 75 which is adapted to engage and slide upon the felt lined channel 73. The guide 74 is fastened to the end of the member 29 by means of gusset plates 76 which are spot welded to opposite sides thereof. The opposite end of the retainer member 29 is provided with a corresponding guide member 78 secured thereto through the medium of a corresponding gusset plate 79. The face plate 78a of this guide member engages and is adapted to slide upon the felt lined face of the guide channel 77. The members 74 and 78 serve as guides for the glass when it is being lowered into the well or elevated therefrom and prevent longitudinal tilting or shifting of the glass.

Referring to Figs. 1 to 4 inclusive, suitable weather stripping is provided for sealing the window opening around the marginal edges of the glass when closed. The sealing strips are arranged and constructed so as to permit free pivotal movement of the glass into and out of ventilating position while at the same time co-operating with the edges of the glass, when closed, so as to provide a relatively tight joint. Along the edge of the glass at the inner face thereof there is provided a relatively soft rubber weather strip having a top section 81, a rear vertical section 81a and a lower horizontal section 81b, the latter extending forwardly to a point adjacent the pivot 31—32. A portion of the section 81b is cut away to accommodate the crank arm 47. Along the outer edge of the glass forwardly of the vertical pivotal axis thereof there is provided a relatively soft rubber weather strip 82 which extends around the reveal continuously from the pivot 39 to the pivot 31 along the outer face of the glass. The lower extension 82a of this strip along the window sill terminates adjacent the pivot 31—32, there being a suitable gap between the adjacent ends of the strips 81b and 82a to accommodate the pivot pin 31 and to permit longitudinal sliding movement thereof. Thus, by means of the weather stripping the window opening is effectually sealed when the glass panel is in closed position.

The operation of the ventilating window is substantially as follows. When the window is raised the regulator arms will swing upwardly toward each other, the cam action of the studs 66 in the guideways 67 effecting the elevation of the glass. Upon reaching its fully elevated position the upper edge of the glass will be anchored in the socket of the bifurcated member 44 of the upper pivot, as seen in Figs. 1 and 8. At this time the regulator arms 64 and 65 are in the positions shown in Figs. 1 and 7 with the terminal end of the crank 50 proximate to the cam slot 72 and the offset finger 70, see Fig. 7. From this point a continued movement of the regulator mechanism in the same direction, i. e. closing direction, will cause the finger 70 of the cam 69 to engage the crank arm 50, forcing it into the cam slot 72, and as the arm 65 continues its travel toward the arm 64 the crank 50 will travel over the rear edge 70a of the cam slot. During this operation, as the crank 50 travels downwardly in the cam slot, the shaft 48a is rotated in its bearing, thus swinging the upper crank arm 47 outwardly as indicated in dotted lines in Fig. 7. The outward swinging movement of the crank arm 47 resulting from the rotation of shaft 48a functions to swing the window on its pivots 31 and 39 into ventilating position.

From its closed position, as shown in Fig. 3, it will be seen that the window glass 24 may be swung on its pivots 31 and 39 into various preferred ventilating positions, two of these positions being illustrated in Figs. 4 and 5. When the glass is swung into the position shown in Fig. 5 with the crank arm 47 assuming the position shown in this figure, the forward upright edge of the glass is moved inwardly to provide a ventilating slot B between the adjacent upright edges of the glass and front pillar. At the same time the rear upright edge of the glass is moved outwardly to product a ventilating slot or gap C between the edge thereof and the rear pillar. During the forward travel of the vehicle, with the window 24 in the ventilating position shown in Fig. 5, low pressure zones will be produced exteriorly of the ventilating openings B and C, and hence air will be exhausted from the interior of the vehicle through these openings in the manner shown by the arrows in Fig. 5.

When it is desired to change the character of the ventilation and circulate air between the interior and exterior of the vehicle, the regulator arm 65 may be moved to its extreme inner position, as shown in Fig. 2. This operation results in swinging the crank arm 47 outwardly from the position shown in Fig. 5 to the position shown in Fig. 4. During this movement the window glass 24 will be given a compound movement, i. e. a swinging movement about the vertical axis of the pivots 31 and 39 and also a rearward or longitudinal shiftable movement in the plane of the glass. It will be understood that the glass may be adjusted into any position intermediate those shown in Figs. 5 and 4 but when shifted into its maximum ventilating position of Fig. 4 the forward edge of the glass will be displaced rearwardly with respect to the front pillar, thus producing a larger gap D effective under certain conditions to permit air to enter the car as shown by the arrows in Fig. 4. At the same time the rear edge of the glass will be displaced rearwardly as well as outwardly so as to increase the size of the rear ventilating opening as at E and also cause the glass to overlie the rear pillar 23. During the forward travel of the vehicle air in increasing quantities will be exhausted through the rear opening E. During the movement of the window regulator arm 65 from the position shown in Fig. 1 to that illustrated in Fig. 2, resulting in the above described compound movement of the window glass, the pivot 31 will be shifted longitudinally within the guide slot 33. At the same time the upper pivot 39 will be turned within its socket or housing and will also be shifted rearwardly against the action of spring 41. The angular shape of the upper end of pivot 39, wherein cam-shaped corners are formed to engage with the sides 38 and 38a of the housing, will produce in conjunction with the spring a desirable resistance to the turning of the pivot, and as a consequence the force of the spring 41 acting on the pivot 39 and the cam shape of the pivot 39 will assist in returning the window glass to its closed position shown in Fig. 3.

Upon operating the regulator mechanism so as to swing the window from its ventilating positions of Fig. 4 or Fig. 5 to closed position, it will be understood that the crank arm 50 will be engaged by the forward edge 69a of the cam slot 72, and as the regulator arm travels rearwardly the shaft 48a will be rotated in the opposite direction than that heretofore described so as to move the window into its closed position of Figs. 1 and 3. Continued movement of the regulator mechanism in the same direction will then lower the window and withdraw the upper edge 27 thereof from the channel-shaped socket 43—44 of the upper pivot 39. During the vertical movement of the glass into and out of the well 51, the glass will be guided by means of the guides 74 and 78 cooperating with the vertical glass runways 73 and 77.

In the modification illustrated in Fig. 11 it will be seen that the upper pivot of the glass in this instance is carried by the glass panel itself and a socket is formed in the upper header for cooperation therewith when the glass is fully raised. In this form of construction the upper channel-shaped binding strip 27 for the top edge of the glass is provided with a vertically extending pivot pin 139. The header 22 is provided with a slot 201 which communicates with a guide slot 202 formed in a block 200 fastened by welding within the header. Thus, when the glass 24 reaches its top position the stud or pivot pin 139 travels into the guide slot 202. This slot permits rotation of the stud 139 when the window is swung into ventilating position and also permits rearward sliding movement of the pivot when the glass is shifted longitudinally between the positions shown in Figs. 4 and 5.

I claim:

1. In a vehicle body having a window frame provided with a window opening and a pivot in the upper portion thereof, a glass panel adapted to be raised and lowered within said opening and movable into and out of engagement with said pivot, and means for swinging the panel and shifting it longitudinally in its plane when in said pivotal relation.

2. In a vehicle body having a window frame provided with a window opening, said frame having a pivot carried thereby, a glass panel adapted to be raised and lowered within said opening and movable into and out of contact with said pivot, means for raising and lowering the panel, and means for swinging the panel and shifting it longitudinally when in said pivotal contact.

3. In a vehicle body having a window frame provided with a window opening, a pivot member depending from the upper portion of said frame, a glass panel adapted to be raised and lowered within said opening and movable into and out of engagement with said pivot member, means for swinging the panel and shifting it longitudinally of the body when in said pivotal engagement, means for raising and lowering the panel, and a single manual control for both of said means.

4. In a vehicle body having a window frame provided with a window opening, a glass panel slidable upwardly and downwardly in said frame, means for pivotally connecting said panel to the frame when the panel is in raised position, and means for swinging said panel horizontally about said pivotal connection into ventilating position and also for shifting the panel longitudinally while in ventilating position.

5. In a vehicle body having a window frame provided with a window opening, a glass panel slidable upwardly and downwardly in said frame, means for pivotally connecting said panel to the frame when the panel is in raised position, and common means for swinging said panel horizontally within said opening into ventilating position and shifting the same longitudinally of the vehicle while in said position.

6. In a vehicle body having a stationary window frame provided with a window opening, a substantially vertically sliding glass panel for said opening, means for pivotally connecting the panel and frame to permit swinging movement of the panel within said opening into ventilating position, and a unitary regulator mechanism having a single manual control for sliding said panel and also for swinging the same into ventilating position, said mechanism having means for shifting the panel longitudinally while in ventilating position.

7. In a vehicle body having a stationary window frame provided with a window opening, a substantially vertically sliding glass panel for said opening, means for pivotally connecting the panel and frame to permit swinging movement of the panel within said opening into ventilating position, and common means comprising a regulator mechanism for sliding said glass panel vertically, for swinging said panel into ventilating position and for varying the longitudinal position of the panel when in ventilating position.

8. In a vehicle body having a window frame provided with an opening, a glass panel, means for pivotally supporting said panel within the opening to permit horizontal swinging movement into ventilating position, and regulator mechanism for raising and lowering said glass panel and including means whereby said panel is shiftable longitudinally of the vehicle while in ventilating position.

ALBERT P. BALL.